United States Patent [19]
Pedginski et al.

[11] Patent Number: 5,882,753
[45] Date of Patent: Mar. 16, 1999

[54] EXTRUDABLE RELEASE COATING

[75] Inventors: James J. Pedginski, Stillwater; James E. Sax, Oakdale; Steven S. Kantner, St. Paul; Raymond R. Rivera, Cottage Grove; Ronald W. Ausen; Stephen W. Bany, both of St. Paul; Albert I. Everaerts, Oakdale; Thomas P. Hanschen, St. Paul; Walter R. Romanko, Woodbury, all of Minn.

[73] Assignee: Minnesota Mining and Manufacturing Company, St. Paul, Minn.

[21] Appl. No.: 897,384

[22] Filed: Jul. 21, 1997

Related U.S. Application Data

[63] Continuation of Ser. No. 249,397, May 26, 1994, abandoned.

[51] Int. Cl.⁶ .................................................. B32B 27/28
[52] U.S. Cl. ...................... 428/40.7; 428/41.8; 428/352; 428/421; 428/422
[58] Field of Search ................... 428/40.7, 41.8, 428/352, 421, 422

[56] References Cited

U.S. PATENT DOCUMENTS

| | | | |
|---|---|---|---|
| 4,379,806 | 4/1983 | Korpman | 428/354 |
| 4,582,736 | 4/1986 | Duncan | 428/40 |
| 4,614,667 | 9/1986 | Larson et al. | 427/54.1 |
| 4,673,611 | 6/1987 | Crass et al. | 428/215 |
| 4,677,017 | 6/1987 | DeAntonis et al. | 428/214 |
| 4,839,123 | 6/1989 | Duncan | 264/22 |
| 4,920,168 | 4/1990 | Nohr et al. | 524/188 |
| 4,923,914 | 5/1990 | Nohr et al. | 524/99 |
| 5,047,196 | 9/1991 | Zuckerberg et al. | 264/171 |
| 5,145,718 | 9/1992 | Pedginski | 427/171 |
| 5,147,346 | 9/1992 | Cancio et al. | 604/389 |
| 5,213,743 | 5/1993 | Ohara et al. | 264/171 |
| 5,518,811 | 5/1996 | Pedginski et al. | 428/343 |

FOREIGN PATENT DOCUMENTS

| | | |
|---|---|---|
| 0 297 060 | 12/1988 | European Pat. Off. . |
| 0 460 393 | 12/1991 | European Pat. Off. . |
| 0 484 093 A2 | 5/1992 | European Pat. Off. . |
| 37 10 670 A1 | 3/1987 | Germany . |
| 58-113283 | 7/1983 | Japan . |
| 3-229776 | 10/1991 | Japan . |
| 92/15626 | 9/1992 | WIPO . |
| WO 92/15626 | 9/1992 | WIPO . |

OTHER PUBLICATIONS

T. Hsu et al., "Surface Effects in Siloxane–Containing Methacrylates", *Polym. Mater. Sci. Eng.*, 55:562–6, 1986.

*Primary Examiner*—Jenna Davis

[57] ABSTRACT

The present invention provides a release coated film, an adhesive tape comprising a release coated film, and processes for preparing the same. The fluoropolymer release layer comprises a graft copolymer of (i) a base polymer containing polymerized units derived from monomers having terminal olefinic double bonds, and (ii) a moiety comprising a fluoroaliphatic group. The film may be coextruded and may subsequently be oriented in at least one direction. Alternately, the release coating can be extrusion coated onto a backing and may be subsequently oriented if the backing is orientable. Adhesives may be coated onto the release coated films either before or after orientation, or they may be coextruded along with the release coating and/or backing.

16 Claims, 2 Drawing Sheets

EXTRUDABLE RELEASE COATING

This is a continuation of application Ser. No. 08/249,397, filed 26 May, 1994 now abandoned.

FIELD OF THE INVENTION

The present invention relates to films and articles having release surfaces applied thereto by extrusion techniques.

BACKGROUND OF THE INVENTION

Articles which have release surfaces are used in a variety of applications. Pressure sensitive adhesive articles, such as tapes, die cuts, labels and the like often employ a release coating as a part of their structure, the coating oftentimes being referred to as a low-adhesion backsize (LAB). The purpose of the release coating is to provide a surface to which the adhesive coating does not permanently adhere. This is especially useful when the article is wound upon itself in roll form. In this form, the adhesive surface contacts the back surface of the article. The LAB prevents the adhesive from permanently adhering to the back surface of the article and allows that article to be unwound.

In the past, release coatings have been applied to surfaces by dissolving the release components in solvent, coating the solution onto a desired surface, and drying to evaporate the solvent. These solvent-based processes have become increasingly undesirable because of the environmental and safety considerations associated with the use of solvents.

This has led to accelerated interest in the use of hot melt extrusion coating of release compositions. For example, U.S. Pat. No. 4,379,806 (Korpman) discloses preparation of pressure-sensitive adhesive tapes by a single step process of coextruding a backing film-forming composition and an adhesive composition. A solventless release agent may be incorporated into either the adhesive or backing, rendering unnecessary the coating of the backside of the tape with a release agent. Korpman states that suitable release agents for incorporation into backing film include synthetic and natural waxes and copolymers of stearyl methacrylate and acrylonitrile. U.S. Pat. No. 5,145,718 (Pedginski) discloses a pressure sensitive adhesive tape wherein a low-adhesion backsize and a pressure sensitive adhesive are applied to opposite sides of a backing that has been oriented in the machine direction. After application of the low-adhesion backsize and adhesive, the backing is oriented in the transverse direction by heating and cross-stretching in the transverse direction. Japanese patent SHO 58[1983]-113283 discloses a process for manufacturing a pressure-sensitive adhesive film comprising a substrate layer, pressure-sensitive adhesive layer and release layer wherein said pressure sensitive adhesive layer is the middle layer. The release layer may be either coextruded along with the other layers, or may be extruded separately and laminated to the adhesive layer of the two-layer film outside of the die.

Several references disclose coextrusion of a film backing and a silicone-containing release layer for pressure sensitive adhesive tape applications. For example, U.S. Pat. No. 4,673,611 (Crass) discloses a tape comprising a coextruded, biaxially-oriented multilayer polypropylene support film and an adhesive layer, wherein the support film comprises at least two layers, the layer facing away from the adhesive comprising an anti-adhesive substance containing polydiorganosiloxane. U.S. Pat. No. 4,839,123 (Duncan) discloses a process for making an oriented polymer film in which a solventless, curable silicone release composition is applied to an extrudable, orientable polymer. The combination of the silicone material and the polymer is extruded as a sheet or film. The orientation process causes the silicone release composition to migrate to at least one surface of the sheet or film. The release composition is then cured to form a substantially continuous release layer on the oriented sheet or film. EPO application 0-484-093-A2 (Oy) discloses a polymer composition for forming release films. The film is formed of a reactive polyolefin that contains functional groups and a reactive silicone or other reactive release substance. The ingredients are caused to react by compounding them together in a molten state. The reactive compounding can be performed in connection with the film preparation to form a release film. The film can be prepared by means of a blown-film, cast-film or extrusion coating technique. German patent application DE 37-10-670 A1 discloses a pressure sensitive adhesive tape with a hand tearable backing that may have an anti-adhesive layer comprising polypropylene with 0.2–3 wt % added polydiorganosiloxane. The backing and anti-adhesive layer may be coextruded. U.S. Pat. No. 5,213,743 (Ohara) discloses a release agent formed by reacting an organopolysiloxane with a hydrocarbon compound having at lease one double bond. The release agent is said to be suitable for both coating and extrusion processing. Japanese Kokai Hei 3-229,776 (Kitamura) discloses a method of making pressure sensitive adhesive tape by coextruding a base material, for instance, polyolefin resin, and a resin layer incorporating a release agent formed from an organic silicone compound. The silicone compound possesses at least one hydrogen group and a hydrocarbon having at least one double bond that is capable of reacting with the hydrogen bond of the silicone compound. The coextruded multilayer film may be oriented in at least one direction before coating with adhesive, or alternately the adhesive may be applied to the coextruded multilayer film and then the entire construction oriented to form a tape.

Silicone-based release coatings, whether solvent or extrusion coated, often show increased transfer with aging. As a result, when used on tapes that are stored in roll form, the release material often transfers to the adhesive surface. Fluoropolymer release coatings are generally more stable and do not show increased transfer with aging. U.S. Pat. No. 4,677,017 (DeAntonis) discloses a multilayered coextruded film and coextrusion process wherein the coextruded film comprises at least one thermoplastic fluoropolymer layer, at least one thermoplastic polymeric layer adjacent to the thermoplastic fluoropolymer layer, and preferably a coextruded adhesive layer between each fluoropolymer layer and each polymeric layer. Each layer in the coextruded film is at least 0.05 mils thick. The coextruded film can be embossed or oriented in at least one direction without delamination, fibrillating or splitting.

The release coated films and articles of the prior art have not proven to be entirely satisfactory. Oftentimes a tie layer is needed to sufficiently adhere the release layer to the film. For example, flame or corona treatment is often employed to enhance said adhesion. In other cases, the release coating migrates upon aging despite the use of the tie layer. In still other cases, limitations exist as to suitable backing materials that may be employed with a given release coating.

A release coated film is therefore needed in which the release layer is stable with aging and extrudable onto a variety of backing materials without the use of additional treatment or a tie layer to enhance the adhesion of the release layer to the backing film. Preferably, the release coated layer can be coextruded with the backing layer without the use of solvents. It is also desirable that the release layer and backing layer be selectable from a wide variety of polymers so that the release coated film characteristics may be optimized for a particular application.

The present invention provides a stable release coated film wherein no tie layer or additional treatment is employed to improve the adherence of the release coating to the substrate surface. The present invention further provides a release coated film which may be made without the use of solvent processing techniques. The present invention also provides an adhesive tape in which minimal release material transfers to the adhesive layer when the tape is stored in roll form. Additionally, the release coated film and backing materials can be varied to optimize the release coated film for specific applications.

SUMMARY OF THE INVENTION

The present invention provides a release coated film, an adhesive tape comprising a release coated film, and processes for preparing the same. The fluoropolymer release coating in all embodiments of the present invention comprises a graft copolymer of (a) a base polymer containing polymerized units derived from monomers that contain terminal olefinic double bonds and (b) a moiety comprising a fluoroaliphatic group. The moiety comprising the fluoroaliphatic group is grafted to a base polymer.

The release coated film of the present invention comprises at least one backing layer having first and second major surfaces and at least one fluoropolymer release layer on at least a portion of at least one of the major surfaces of the backing layer. The base polymer of the fluoropolymer release coating and the backing layer are variable and may be selected from a wide variety of polymers so that the release coated film characteristics may be optimized for a particular application. In one embodiment, the release layer is intimately bonded to the backing layer which means the two layers are not easily physically separated without substantially destroying the film. In another embodiment, the release coated film is a coextruded film wherein the release layer and backing layer are simultaneously extruded. If desired, the coextruded release coated film may be subsequently oriented in at least one direction. It is also possible to have multiple release layers coextruded with multiple backing layers.

In another embodiment, the present invention provides a release coated film wherein the release layer has been extruded onto an existing backing. The resultant release coated film may be oriented in at least one direction after extrusion coating. The release coating may be extrusion coated onto one or both sides of the backing. In addition, the existing backing may be unoriented or monoaxially or biaxially oriented.

The present invention additionally provides an adhesive tape comprising at least one extruded fluoropolymer release layer having a first and second major surface and at least one adhesive coating on at least a portion of at least one major surface of the release layer. The adhesive tape may also comprise a backing layer which preferably is interposed between the adhesive coating and release layer. In this case, the adhesive may be coextruded with the release coating and backing layer. Alternatively, the adhesive may be applied to a coextruded release coated backing or an extruded release coated backing. If desired, the adhesive tape may be oriented in at least one direction.

The present invention is also directed to a process for preparing a film. The process comprises the steps of:
(a) providing an extrudable polymer backing material and an extrudable release material comprising a fluorochemical graft copolymer of (i) a base polymer containing polymerized units derived from monomers having terminal olefinic double bonds and
(ii) a moiety comprising a fluoroaliphatic group;
(b) forming at least one molten stream of the polymer backing material and at least one molten stream of the release material;
(c) combining the molten streams into a unified multilayer structure having at least one surface of the fluoropolymer release material; and
(d) cooling the unified structure.

The film may optionally be oriented in at least one direction.

In a variation of the above process, the release material may be extruded onto an existing backing. The existing backing may be unoriented or monoaxially or biaxially oriented. Subsequent to extrusion coating onto an existing backing, the release coated film may be further oriented.

The present invention is also directed to a process for preparing an adhesive tape. This process comprises the steps (a) through (d) above with the addition of providing an extrudable adhesive material in step (a) and forming at least one molten stream of the adhesive in step (b). The presence of the backing material is, however, optional, as the adhesive may be coextruded with the release material. In an alternate process, an adhesive tape is formed by extruding the release material onto an existing backing to form a multilayer structure, and subsequently applying adhesive to said multilayer structure. In still another process, an adhesive material is coated onto a coextruded release coated film. The process for preparing the adhesive tape may include an orientation step before and/or after the adhesive is applied. The adhesive may be applied using techniques known in the art, such as hot melt, extrusion, laminating, solvent and emulsion techniques.

The release film of the invention is useful as a release liner which may be used for adhesive transfer tape and labelstock. The release film may also be used as a diaper frontal film, a diaper backsheet film, and a packaging film for adhesive coated articles such as linerless feminine napkins. The adhesive tape of the present invention may be used in a variety of applications including packaging tapes; masking tapes; diaper closure tapes such as diaper fastening, release, and frontal tapes; medical tapes; electrical tapes; and the like, and is especially useful for integrated tapes wherein the backing, release layer and adhesive are coextruded in a solventless process.

BRIEF DESCRIPTION OF THE DRAWINGS

The articles of the present invention are illustrated in the accompanying drawings in which like reference numerals refer to the same elements throughout the several views and in which.

DETAILED DESCRIPTION

Figure 1:
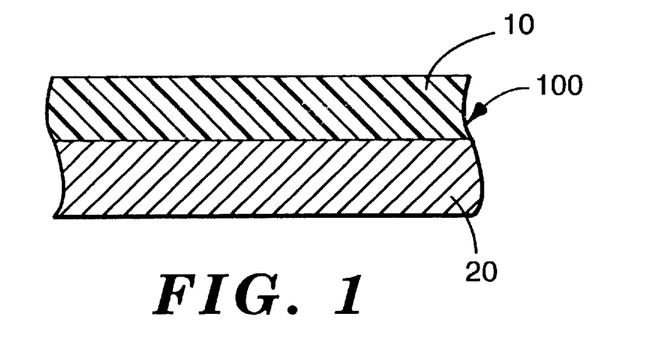
FIGS. 1 and 1A show cross-sectional views of embodiments of the release film of the invention.
Figure 1A:
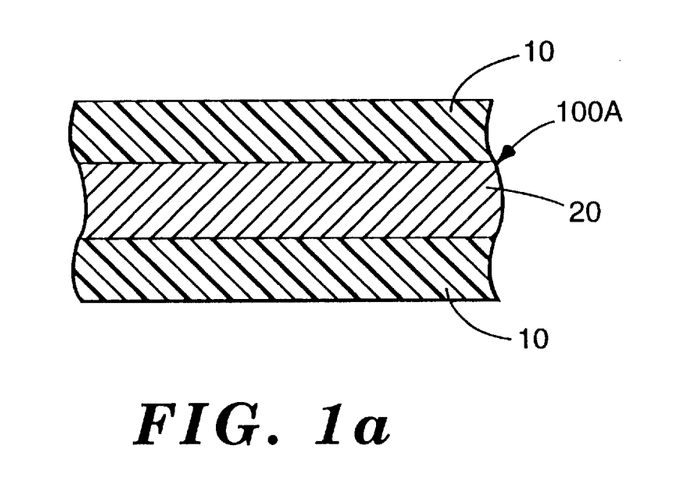

The present invention will be further understood with reference to the accompanying figures. Specifically, FIG. 1 shows a cross-sectional view of the release film 100 of the invention. In this FIG. 1, the release film 100 comprises a release layer 10 on a backing (or support) layer 20. In FIG. 1a, a release film 100A is shown in which a second release layer 10 has been applied to backing layer 20 opposite the first release layer.

Figure 2:
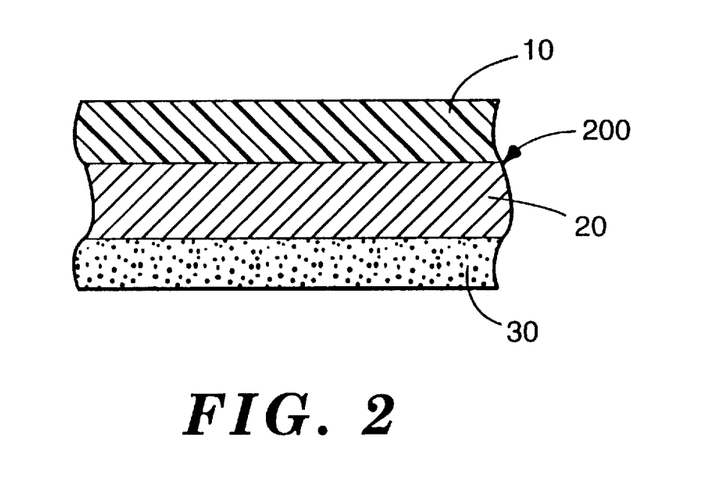
FIGS. 2–5 show cross-sectional views of alternative embodiments of adhesive articles of the invention.

FIGS. 2–5 show various embodiments of adhesive articles according to the invention. In FIG. 2, the adhesive article 200 comprises a backing layer 20 having a release layer 10 on one of its major surfaces and an adhesive layer 30 on the opposite major surface.

Figure 3:
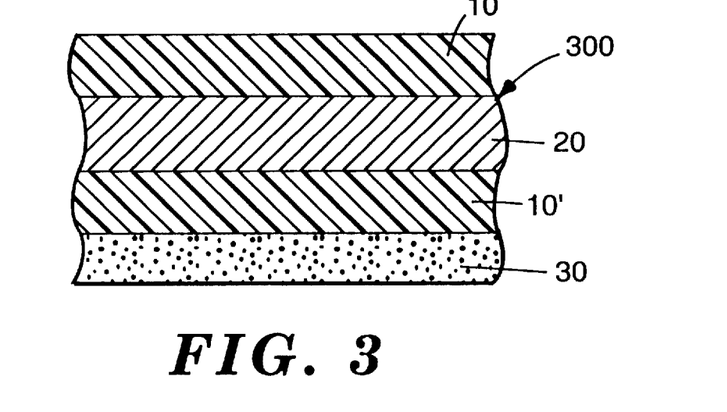

In FIG. 3 the adhesive article 300 comprises backing layer 20, two fluoropolymer layers 10 and 10' on opposite surfaces of backing layer 20, and adhesive layer 30 on one of the fluoropolymer layers 10'. The process of forming the adhesive article of this figure, in particular the temperature at which the adhesive is applied, must be controlled to preserve the release properties of the fluoropolymer layer 10'. For example, if the article of FIG. 3 is coextruded, the adhesive will not release from the fluoropolymer layer 10'. If, however, the adhesive is cold laminated to the fluoropolymer surface 10', it will release from this layer.

Figure 4:
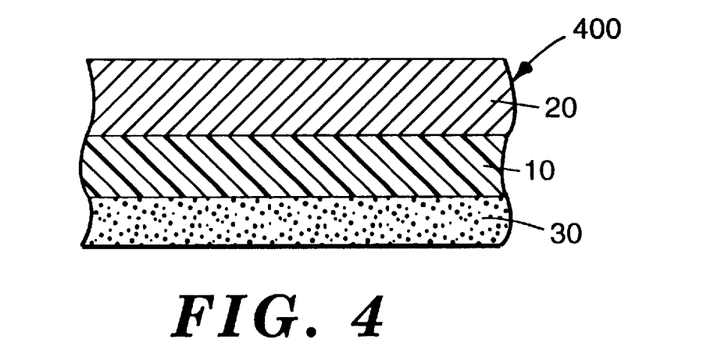

FIG. 4 shows an adhesive article 400 which comprises backing layer 20, fluoropolymer layer 10 on one major surface of backing layer 20 and adhesive 30 on fluoropolymer layer 10. The same process considerations as discussed above with respect to FIG. 3 apply here as well.

Figure 5:
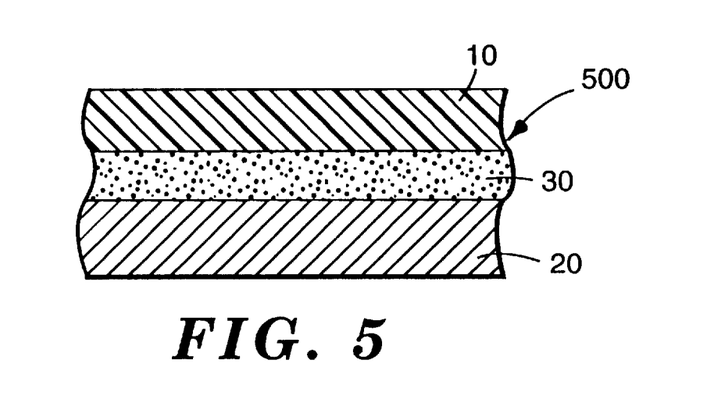

FIG. 5 shows a release film 500 which comprises backing layer 20, an adhesive layer 30 on one surface of backing layer 20, and release layer 10 on adhesive layer 30. In this figure, the adhesive layer 30 functions as a tie layer between the backing layer 20 and the release layer 10.

Backing

With respect to various elements of the release film of the invention, the backing layer 20 may be selected from a wide variety of materials. When the fluoropolymer release material is coextruded with the backing, the backing layer comprises a thermoplastic polymer. Representative examples of these materials include polyamide (such as nylon); and polyolefins, (such as polypropylene, polyethylene, polybutylene, poly-4-methylpentene and other polyolefins); polystyrene; polyester; copolyester; polyvinyl chloride; polyvinyl acetate; copolymers such as ethylene/propylene copolymer, propylene/butylene copolymer, ethylene/propylene/butylene terpolymer, ethylene/vinyl acetate copolymer, and ethylene/butyl acrylate copolymer; polymethyl methacrylate; thermoplastic rubber block copolymer; and blends, mixtures and copolymers thereof. Especially preferred backing materials include polypropylene, polypropylene blended with small amounts, e.g. up to about 10% by weight, of other polyolefins, and copolymers of propylene and other alpha-olefins. The most preferred backing for packaging tape material is semi-crystalline polypropylene having a melting point greater than about 160° C. The aforementioned polymeric materials are commercially available and may be used without modification. Alternatively they may be modified in ways well known to one of ordinary skill in the art. For example, the compositions for preparing polymeric film backings can be modified with minor amounts of conventional modifiers, such as, for example, colorants, pigments, dyes, antioxidants, and fillers, such as zinc oxide, titanium dioxide, calcium carbonate, hydrocarbon resins, and the like. Preferably, the additives do not exude to the surface with time or elevated temperature.

When the fluoropolymer release material is extrusion coated onto a pre-existing substrate, the substrate may be selected from the list of thermoplastic materials identified above. Additionally, it may be selected from non-thermoplastic polymers, metals, cloth, non-woven webs (polymeric and non-polymeric), polymeric foam, ceramic, paper, etc.

When the release material is coextruded with the backing or is extrusion coated onto a polymer film, it is also preferred for some applications that the backing be orientable in at least one direction after extrusion of the release coating to form an oriented release coated film. As such, orientable backings selected from the aforementioned polymeric materials are especially preferred backing layers for forming the release coated films of the present invention. The term oriented herein refers to strengthening the polymer by stretching at a temperature below its crystalline melting point, as described in *The Science and Technology of Polymer Films*, edited by Orville J. Sweeting, Volume I, Interscience Publishers, John Wiley & Sons, Chapter 10, "Film Orientation", Jean B. Mauro and Joseph J. Levitzky, pp. 462–465.

Release Coating

The fluoropolymer material useful as the release coating in the present invention is an extrudable material that comprises a graft copolymer of a base polymer and a moiety comprising a fluoroaliphatic group. It is preferable that the release layer be orientable in at least one direction.

The fluoroaliphatic group may be derived from a fluorochemical olefin comprising a fluoroaliphatic group and a free-radically reactive double bond. The grafting occurs through the free radically-reactive double bond. In the instant specification and claims, a reference to a fluoroaliphatic group grafted through a double bond designates the presence of such a saturated link and does not designate the presence of olefinic unsaturation in the grafted moiety as it is incorporated in the graft copolymer. The fluoropolymer release material may also include additives, such as fillers, dyes, ultraviolet absorbers or stabilizers, such as antioxidants and free-radical scavengers. Typical stabilizers include tetrakis[methylene 3-(3',5'-di-tert-butyl-4'-hydroxyphenyl)propionate]methane, 1,3,5-trimethyl-2,4,6-tris(3,5-di-tert-butyl-4-hydroxybenzyl)benzene, 2(4-hydroxy-3,5-tert-butyl-anilino)4,6-bis(n-octyl-thio-1,3,5, triazine), 2,2'-methylenebis-(4-methyl-6-tert-butylphenol), 2,2'-methylenebis-(4-ethyl-6-tert-butylphenol), 4,4'-thiobis-(6-tert-butyl-m-cresol), octadecyl 3,5-di-tert-butyl-4-hydroxy hydrocinnamate, tri(nonylated phenyl)phosphite, 3,3'-dilauryl thiodipropionate, and zinc dibutyldithiocarbamate. Such stabilizers can be used alone or in combination. Examples of commercially available stabilizers suitable for the release layer of this invention are sold under the following trademarks: ETHANOX™ 376, Ethyl Corp., IRGANOX™ 1010, Ciba-Geigy Corp., IRGAFOS™ 168, Ciba-Geigy Corp., and CYANOX™ LTDP, American Cyanamid Co. The stabilizers may be added to the release material formulation, most preferably after the grafting reaction has taken place, at concentrations from about 0.01 to about 2 percent by weight to reduce gel formation or molecular weight degradation.

Fluorochemicals that can be grafted to the base polymer include known fluorochemical olefins that comprise a fluoroaliphatic group and a free-radically reactive double bond. Fluorochemical olefins suitable for use in the invention include those cited in U.S. Pat. No. 5,314,959 (Rolando), U.S. Pat. No. 3,876,729 (Mueller), U.S. Pat. No. 4,100,225 (Mueller), and U.S. Pat. No. 4,666,991 (Matsui), the disclosures of which regarding the fluoropolymer release materials and fluorochemical olefins are incorporated herein by reference. This list is intended to be merely exemplary and not exhaustive of patents disclosing suitable fluorochemical olefins. Generally, suitable fluorochemical olefins comprise a fluoroaliphatic group bonded through a linking group to a free-radically reactive double bond and can be represented by the general Formula I below:

$(R_f)_aQ(CR=CH_2)_b$          Formula I wherein a, b, R, $R_f$ and Q are as defined below.

In a compound of Formula I, a and b are integers representing the number of fluoroaliphatic groups and the number of olefinic groups, respectively, in the fluorochemical olefin. The value of "a" can be from 1 to about 10, preferably 1 to about 6, more preferably 1 to about 3, and most preferably 1. The value of "b" can be from 1 to about 2; however, when "b" is 2, the concentration of the moiety comprising a fluoroaliphatic group is preferably maintained fairly low. The concentration of this moiety when "b" is two will generally be less than 10% by weight, preferably less than 5% by weight, most preferably less than 2% by weight of the graft copolymer. The optimal concentration of the moiety depends on the reactivity of the group comprising the free radically-reactive double bond. R in a compound of Formula I is hydrogen or lower alkyl (i.e., straight chain or branched chain alkyl of 1 to about 4 carbon atoms).

Q is an (a+b)-valent organic moiety that can have a wide variety of structures as long as it does not significantly interfere with the grafting reaction. The particular structure of Q for a particular fluorochemical olefin is not unduly critical to this invention. Q can therefore be selected by virtue of ease of preparation and, for example, commercial availability of the fluorochemical olefin or the particular reactants used in preparing the fluorochemical olefin.

$R_f$ is a fluoroaliphatic group that is fluorinated, stable, inert, non-polar, preferably saturated, hydrophobic and oleophobic. $R_f$ can be straight chain, branched chain, or, if sufficiently large, cyclic, or a combination thereof, such as alkylcycloalkyl. The fluoroaliphatic group can also include catenary oxygen, sulfur, or nitrogen. Generally $R_f$ will have 3 to about 20 carbons atoms, referably 6 to about 12 carbon atoms, and will contain about 40 to about 78 weight percent, preferably about 50 to about 78 weight percent, carbon-bound fluorine. The terminal portion of the $R_f$ group is fully fluorinated and contains at least 7 fluorine atoms. Exemplary terminal portions include —$CF_2CF_2CF_3$, —$CF(CF_3)_2$, —$CF_2SF_5$, and the like. Preferred $R_f$ groups are fully or substantially fully fluorinated, as in the case where $R_f$ is perfluoroalkyl (i.e., $C_nF_{2n+1}$).

Several particular exemplary compounds of Formula I are shown below:

$C_8F_{17}SO_2N(C_4H_9)CH_2CH_2OC(O)CH=CH_2$
$C_8F_{17}SO_2N(C_2H_5)CH_2CH_2OC(O)CH=CH_2$
$C_8F_{17}SO_2N(CH_3)CH_2CH_2OC(O)CH=CH_2$
$C_8F_{17}SO_2N(C_2H_5)CH_2CH_2OC(O)C(CH_3)=CH_2$
$C_7F_{15}CH_2OC(O)CH=CH_2$
$C_7F_{15}CH_2OC(O)C(CH_3)=CH_2$
$C_8F_{17}SO_2N(C_2H_5)CH_2CH=CH_2$
$C_8F_{17}SO_2N(CH_3)CH_2CH_2OC(O)C(CH_3)=CH_2$
$C_8F_{17}SO_2N(CH_3)CH_2CH_2CH_2CH_2OC(O)C(CH_3)=CH_2$
$C_8F_{17}SO_2N(CH_3)CH_2CH=CH_2$
$C_8F_{17}SO_2N(CH_3)CH_2CH_2OCH=CH_2$
$C_8F_{17}(CH_2)_{10}OC(O)CH=CH_2$
$C_8F_{17}CH_2CH_2OC(O)CH=CH_2$
$C_6F_{13}C_2H_4SC_2H_4OC(O)CH=CH_2$
$(C_3F_7)_3CCH_2OC(O)CH=CH_2$
$(C_4F_9CO)_2NCH_2CH_2OC(O)C(CH_3)=CH_2$ $SF_5(CF_2)_4CH_2OC(O)CH=CH_2$

In a preferred embodiment, the graft copolymer comprises a polymeric backbone comprising polymerized units derived from monomers having terminal olefinic double bonds, having bonded thereto a moiety of the formula wherein Q is a divalent linking group (that is, "a" and "b" are both 1) that does not substantially interfere with free radical polymerization, R and $R_f$ are as defined above, and "x" can be 1 to about 10. It is known to those of skill in the art that the grafting reaction is random; and therefore, the number and location of moieties on the backbone is variable.

Preferably a graft copolymer of the invention comprises about 0.1% to about 20%, more preferably 0.5 to about 10% by weight, of the moiety comprising the fluoroaliphatic group. The preferred level may vary with the specific application, the release level desired, and choice of base polymer. For example, when the graft copolymer is used as a release coating on oriented polypropylene the preferred amount of moiety is about 1% by weight; when used as a release coating on cast polypropylene the preferred amount of the moiety is from about 3% to about 10% by weight. Levels greater than about 10% may result in ungrafted monomer that can bloom to the surface, resulting in substantial fluorochemical transfer and contamination of the adhesive surface in contact with the release layer. The preferred amount will vary with the backing layer material used and ultimate release values desired.

Suitable hydrocarbon backbone polymers useful in preparing the graft copolymer, also referred to herein as base polymers, include polymers comprising polymerized units derived from monomers having terminal olefinic double bonds. The base polymer has an abstractable hydrogen which gives rise to a free radical site. This class of polymers is known to those skilled in the art and includes polymers such as polypropylene, polyethylene, polybutylene, poly-4-methylpentene, other polyolefins, polystyrene, copolymers such as ethylene/propylene copolymer; propylene/butylene copolymer; ethylene/propylene/butylene terpolymer; ethylene/vinyl acetate copolymer; and ethylene/butyl acrylate copolymer, and the like, and mixtures and blends thereof. Such polymers of any molecular weight are suitable so long as they are extrudable. Low molecular weight polyolefins such as polyethylene and polypropylene are particularly useful as base polymers for graft copolymers used in the release coatings of the present invention. Polymers with a wide range of melt flow index values (e.g., from about 0.1 to about 500) are suitable. The base polymer of choice will depend on the specific application. For example, when the graft copolymer is used as a release coating on oriented polypropylene, polyethylene is the preferred base polymer (and more preferably, linear low density polyethylene); when used as a release coating on cast polypropylene, polypropylene is the preferred base polymer.

In addition, the graft copolymer may be blended with at least one other suitable thermoplastic polymer to meet the needs of a particular application. Suitable thermoplastic polymers may comprise the same polymer as the backbone. Alternatively, the thermoplastic polymer may be selected from a variety of thermoplastic polymers, including the aforementioned thermoplastic polymers suitable for the backing layer.

Adhesive

Adhesives useful in the preparation of an adhesive article of the present invention include pressure sensitive and non-pressure sensitive adhesives, including solvent-, heat-, or radiation-activated adhesive systems. Pressure sensitive adhesives (PSAs) are a preferred class of adhesives for use in the invention. PSAs are normally tacky at room temperature and can be adhered to a surface by application of, at most, light finger pressure.

The pressure sensitive adhesives useful in the invention may generally be based on general compositions of polyacrylate; polyvinyl ether; diene-containing rubber such as natural rubber, polyisoprene, and polybutadiene; polychloroprene; butyl rubber; butadiene-acrylonitrile polymer; thermoplastic elastomer block copolymers such as the styrene-isoprene and styrene-isoprene-styrene block copolymers, ethylene-propylene-diene polymers, and styrene-butadiene polymer; poly-alpha-olefin; amorphous polyolefin; ethylene-containing copolymer such as ethylene vinyl acetate, ethylene ethylacrylate, and ethylene methylacrylate; polyurethane; polyamide; epoxy; polyvinyl-pyrrolidone and vinylpyrrolidone copolymers; polyesters; and mixtures of the above. A general description of useful pressure-sensitive adhesives may be found in *Encyclopedia of Polymer Science and Engineering*, Vol. 13, Wiley-Interscience Publishers (New York, 1988). Additional description of useful pressure sensitive adhesives may be found in *Encyclopedia of Polymer Science and Technology*, Vol. 1, Interscience Publishers (New York, 1964).

Other examples of PSA's useful in the invention are described in the patent literature. Examples of these patents include U.S. Pat. No. Re 24,906 (Ulrich), U.S. Pat. No. 3,389,827 (Abere et al at Col. 4-Col. 5), U.S. Pat. No. 4,080,348 (Korpman), U.S. Pat. No. 4,136,071 (Korpman), U.S. Pat. No. 4,792,584 (Shiraki et al), U.S. Pat. No. 4,883,179 (Young et al), U.S. Pat. No. 5,019,071 (Bany), and U.S. Pat. No. 4,952,650 (Young et al).

Adhesive compositions that are preferred for the coating of pressure-sensitive adhesive 30 of the tape of this invention comprise an elastomeric component and a tackifier resin component, wherein the tackifier component is present in an amount of from about 0 to about 300 parts by weight, preferably 50 to about 150 parts by weight, per 100 parts by weight of the elastomeric component. Preferably, the elastomeric component comprises at least one thermoplastic-elastomeric block copolymer. The tackifier resin component preferably comprises a solid tackifier resin or resins.

The tackifier resin component of the pressure-sensitive adhesive compositions preferably comprises at least a major amount of a tackifier resin and may contain a minor amount, i.e., up to 50% by weight of other resins compatible with the elastomeric component. Tackifier resins suitable for use in layer 30 of the tape of this invention include hydrocarbon resins, rosins, hydrogenated rosins, rosin esters, polyterpene resins, and other resins so long as adhesives containing them exhibit the proper balance of properties in the "quickstick", adhesion, and cohesion strength tests as described in "Pressure-Sensitive Tapes and Labels" in C. W. Bemmels, *Handbook of Adhesives*, edited by Irving Skeist, Van Nostrand Reinhold Company (1977), pages 724–735, incorporated herein by reference. The preferred tackifier resins are hydrocarbon resins derived from olefins and diolefins having five carbon atoms. Examples of commercially available tackifier resins suitable for the pressure-sensitive adhesive layer of this invention are sold under the following trademarks: WINGTACK™, Goodyear Tire and Rubber Co., PICCOLYTE™ A, Hercules, Inc., and ESCOREZ™, Exxon Chemical Co. Other resins that can be employed in minor amounts in the tackifier resin component of the adhesive composition include polymers and copolymers of α-methylstyrene, vinyltoluene, and similar aromatic monomers, preferably containing from about 8 to 12 carbon atoms, polymers of coumarone, indene, and related cyclic compounds, and other resins providing internal strength to the overall composition.

The pressure-sensitive adhesive compositions may also include some amounts of other materials such as antioxidants, stabilizers, ultraviolet absorbers or stabilizers, fillers, curatives, solvents, pigments, and the like. The amount of such additives should be sufficiently low such that they do not interfere with the adhesion properties of the adhesive. Antioxidants are typically present in an amount ranging from about 0.3 to about 5.0% by weight of thermoplastic-elastomeric block copolymer. Other additives can be present in greater amounts. Additives for the adhesive composition of this invention are described in greater detail in *Handbook of Pressure Sensitive Adhesive Technology*, Second Edition, edited by Donatas Satas, Van Nostrand Reinhold (New York: 1989), pp. 332–335, incorporated herein by reference.

Adhesives used in the present invention are preferably extrudable. They may be crosslinked, if desired, after application. While it is preferred that the adhesive be applied by extrusion techniques, the adhesive may be applied by a variety of other techniques. It may be coextruded with the release layer alone, or with a backing and release layer. Alternatively, it may be extruded onto a pre-existing surface.

Process

The films and adhesive articles of the invention can be prepared by the extrusion techniques previously mentioned. More specifically, the fluoropolymer release material may be coextruded along with the polymeric film backing using a separate die for each component, a single die with two orifices, or a single die with laminar flow out of a single orifice. The coextruded film may then be either monoaxially or biaxially oriented. Alternately, the fluoropolymer may be extrusion coated onto any suitable backing, including unoriented or monoaxially or biaxially oriented film. The extrusion coated backing may be further oriented. The orientation process dramatically improves the adhesion of the release material to the backing, thereby reducing contamination of the adhesive that contacts the release layer. Orientation also increases the tensile strength of the film and results in a thinner release material layer, thereby giving improved performance and economy. The release film of the present invention also has better thermal stability than most conventional release films due to the higher softening temperature of the polyolefin backbone of the fluoropolymer release material. An adhesive may be applied to the film backing either before or after orientation to form an adhesive tape that may be dispensed in roll form.

The process of the invention includes the following embodiments:

Embodiment A

A process for preparing a coextruded release film, comprising the steps of:

(a) providing an extrudable polymer backing material and an extrudable release material comprising a fluorochemical graft copolymer of (i) a base polymer containing polymerized units derived from monomers having terminal olefinic double bonds and (ii) a moiety comprising a fluoroaliphatic group;

(b) forming at least one molten stream of the polymer backing material and at least one molten stream of the release material;

(c) combining the molten streams into a unified multilayer structure having at least one surface of the fluoropolymer release material; and (d) cooling the unified structure.

Optionally, the molten unified multilayer structure may be blown. In addition, the unified structure resulting from this process may be oriented.

Embodiment B

A process for preparing a release coated film, comprising the steps of:

(a) providing a backing layer and an extrudable release material comprising a fluorochemical graft copolymer of (i) a base polymer containing polymerized units derived from monomers having terminal olefinic double bonds and (ii) a moiety comprising a fluoroaliphatic group;

(b) forming at least one molten stream of the release material;

(c) extruding said molten stream onto said backing layer to form a multilayer structure; and (d) cooling said multilayer structure.

Optionally, the multilayer structure may be oriented before or after the cooling step (d).

Embodiment C

A process for preparing an adhesive tape, comprising the steps of:

(a) providing an extrudable polymer backing material and an extrudable release material comprising a fluorochemical graft copolymer of (i) a base polymer containing polymerized units derived from monomers having terminal olefinic double bonds and (ii) a moiety comprising a fluoroaliphatic group;

(b) forming at least one molten stream of the polymer backing material and at least one molten stream of the release material;

(c) combining the molten streams into a unified multilayer structure having at least one surface of the fluoropolymer release material; and (d) applying a layer of adhesive material to said multilayer structure.

If desired, the unified structure may be cooled and oriented in at least one direction prior to applying the adhesive. After applying the adhesive, the structure may be further oriented; however, orientation in the machine-direction may be difficult by conventional processing means.

Embodiment D

A process for preparing an adhesive tape, comprising the steps of:

(a) providing an extrudable polymer backing material, an extrudable adhesive material, and an extrudable release material comprising a fluorochemical graft copolymer of (i) a base polymer containing polymerized units derived from monomers having terminal olefinic double bonds and (ii) a moiety comprising a fluoroaliphatic group;

(b) forming at least one molten stream of each of the polymer backing material, the adhesive material, and the graft fluoropolymer material;

(c) combining the molten streams into a unified multilayer structure having at least one layer of each of the materials of step a); and (d) cooling the multilayer structure.

The fluoropolymer release layer and adhesive layer may be coextruded onto opposite surfaces of the backing layer. Alternatively, the fluoropolymer release layer may be coextruded onto the backing layer while the adhesive is coextruded onto said fluoropolymer layer. In this case, the fluoropolymer layer functions as a tie layer for the adhesive and backing. In still another alternative process, the adhesive material may be interposed between the backing material and the release material during coextrusion. In this case, the adhesive layer functions as a tie layer between the backing and release layers. The multilayer structure may be oriented in at least one direction; however, an exposed adhesive layer would make orientation in the machine-direction difficult by conventional processing means.

Embodiment E

A process for preparing an adhesive tape, comprising the steps of:

(a) providing a backing having first and second major surfaces; an extrudable release material comprising a fluorochemical graft copolymer of (i) a base polymer containing polymerized units derived from monomers having terminal olefinic double bonds and (ii) a moiety comprising a fluoroaliphatic group; and an adhesive material;

(b) forming a molten stream of said extrudable release material;

(c) applying said molten stream of said extrudable release material to at least a portion of at least one major surface of said backing to form a multilayer structure; and (d) applying a layer of said adhesive material to said multilayer structure.

Optionally, the multilayer structure may be oriented in at least one direction; however, an exposed adhesive layer would make orientation in the length-direction difficult by orienting over rollers.

Embodiment F

A process for preparing a release coated adhesive tape, comprising the steps of:

(a) providing a backing having first and second major surfaces; an extrudable release material comprising a fluorochemical graft copolymer of (i) a base polymer containing polymerized units derived from monomers having terminal olefinic double bonds and (ii) a moiety comprising a fluoroaliphatic group; and an extrudable adhesive material;

(b) forming molten streams of said extrudable release material and said extrudable adhesive material;

(c) applying said molten streams to at least a portion of at least one major surface of said backing to form a multilayer structure; and (d) cooling said multilayer structure.

If desired, the unified structure may be oriented in at least one direction if the backing is orientable. The presence of a backing layer is optional in the processes for preparing adhesive tapes of the present invention as the adhesive may be deposited onto or coextruded with a release layer only.

The above listing of embodiments is not intended to be exhaustive; variations within the spirit of the invention may be readily apparent to one of ordinary skill.

Coating Conditions

The thickness of the fluoropolymer release coating may be varied within a very wide range. For example, the coating thickness may vary from 0.2 (or less) micrometer (μm) to as thick as desired. Preferably, the release layer is less than about 1 μm thick. The thickness of the applied release coating layer can be significantly reduced by orienting the release coated film after the fluoropolymer release material has been extruded onto the backing layer. For example, a release coated polypropylene film can typically be length oriented by a factor of about 5:1 (with a resultant slight decrease in the width of the film) and transverse oriented by a factor of about 9:1 so that the area of the film is increased by about 45 times. This means that the thickness of the release coating will be decreased by approximately that factor. Consequently, the fluoropolymer release material may be applied at about 45 times the desired final thickness prior to orientation of the film. The orientation has also been found to greatly improve the adhesion of the release coating to the backing and the release performance of the release material.

Alternatively, the film may be blown as it exits the coating die. During the blowing process, some degree of stretching is imparted to the film, and the area of the film may generally be increased by a factor of about 20. Consequently, the fluoropolymer release material may be applied at about 20 times the desired final thickness. The amount of stretching is dependent on the size of the die orifice and the circumference of the blown film. Furthermore, subsequent to the blowing process, the film may be oriented to provide a further decrease in film and coating thickness or strengthen the film.

When the release coated film is oriented, the release coating and the backing layer may become so intimately bonded that it is difficult to separate them without destroying the film. It may, however, be possible to physically separate the two layers prior to orientation. Alternatively, the release layer and backing layer may be sufficiently compatible that they become intimately bonded without the need for orientation.

When extrusion coating onto polymer film backings that will not be oriented, it is preferable that the base polymer of the graft copolymer be miscible with the polymer of the backing film. Compilations of polymer miscibility data are commonly available, and suitable backing polymers, i.e., those that are miscible with the particular base polymer, can be easily selected by those skilled in the art. The base polymer itself is of course a suitable backing polymer for use in either the coextruded or extruded article of the invention. With existing technology at present, the lower limit at which the release coating can be easily extruded as a single layer is about 6.4 μm (0.25 mil). However, release coatings as thin as about 0.01 mil (0.25 μm) can be obtained by coextrusion.

The total thickness of the release coated film is usually between about 10 μm (0.4 mil) and 150 μm (6 mils), preferably between about 25 μm (1 mil) and 50 μm (2 mils).

This invention is illustrated by the following examples, but the particular materials and amounts thereof recited in these examples, as well as other conditions and details should not be construed to unduly limit this invention.

COEXTRUDED ORIENTED RELEASE COATED FILM

EXAMPLE 1

The fluoropolymer release material used in this procedure was prepared according to the following procedure. Linear low density polyethylene (LLDPE) resin base polymer, ASPUN™ 6806 resin, having a melt flow index of 105 (available from Dow Chemical Company) was dry blended with the fluoroaliphatic group-containing monomer, n-methyl perfluorooctane-sulfonamido ethyl acrylate (NR$_f$OSEA) in 900 g (2 lb) batches and fed with an auger feeder to the hopper of a 34 mm (1.3 in) counter-rotating Leistritz twin screw extruder (Leistritz LSM 30.34 GC, Nurenberg, Germany; length to diameter ratio L/D=35). The reactive NR$_f$OSEA monomer was 0.5% by weight of the total mixture. A 50/50 weight percent homogeneous blend of two liquid initiators (2,5-dimethyl-2,5-di(t-butylperoxy) hexane (Lupersol™ 101, available from Elf Atochem North America, Inc., Philadelphia, Pa.) and 2,5-dimethyl-2,5-di(t-butylperoxy)hex-3-yne (Lupersol™ 130, Elf Atochem) was added into the feed zone of the extruder at a rate equivalent to 0.01% by weight of the polyethylene/NR$_f$OSEA mixture. The twin screw extruder was outfitted with fully intermeshing forwarding screws throughout its entire length, and screw rotation was 100 RPM. The extruder temperature profile for the ten 120 mm (4.7 in) zones was:

| zone 1 | water cooled |
|---|---|
| zone 2 | 130° C. (266° F.) |
| zone 3 | 140° C. (284° F.) |
| zone 4 | 180° C. (356° F.) |
| zone 5 | 180° C. (356° F.) |
| zone 6 | 180° C. (356° F.) |
| zone 7 | 190° C. (374° F.) |
| zone 8 | 190° C. (374° F.) |
| zone 9 | 180° C. (356° F.) |
| zone 10 | 160° C. (320° F.) |
| endcap | 120° C. (248° F.) |

All temperatures reported may vary by ±3° C. from nominal.

The overall flowrate was 37 g/min (0.08 lb/min). The graft copolymer (hereinafter grafted LLDPE) produced in the twin screw extruder was extruded out of a stranding die into a water cooling bath and the material was then pelletized into generally cylindrical pellets of about 3 mm (0.1 in) in length and 1.5 mm (0.06 in) in diameter. The pellets produced in this process were then dried in an oven for 4 hours at 66° C. (150° F.) to remove residual moisture.

The grafted LLDPE was then coextruded with a polypropylene resin, resin #3374X available from Fina Chemical Company using a dual manifold die (such as those available from Cloeren Extrusion Die Company) to produce a two-layer film. In this particular die, the grafted LLDPE passed through a manifold which was inset 2.54 cm (1 inch) from the outside edge of the manifold occupied by the polypropylene resin. The dual manifold die was maintained at 243° C. (470° F.). The grafted LLDPE was extruded with a 3.2 cm (1¼ inches) extruder available from Killion Extruders Inc. The temperatures of this extrusion process are listed in Table 1 below. The flowrate of the grafted LLDPE layer was about 7.5 g/min (0.017 lb/min.).

TABLE 1

Graft Fluoropolymer Extruder Processing Conditions
(Killion 3.2 cm [1¼ inches] Extruder)

| Region | Temp (°F.) | Temp (°C.) |
|---|---|---|
| Zone 1 | 300 | 149 |
| Zone 2 | 330 | 166 |
| Zone 3 | 370 | 188 |
| Endcap | 370 | 188 |
| Melt Temp. | 385 | 196 |

TABLE 1-continued

Graft Fluoropolymer Extruder Processing Conditions
(Killion 3.2 cm [1¼ inches] Extruder)

| Region | Temp (°F.) | Temp (°C.) |
|---|---|---|
| Neck Tube Temp. | 370 | 188 |
| RPM = 5 | | |

The polypropylene backing layer was simultaneously extruded with a 4.4 cm (1¾ inches) extruder available from HPM Extruders Inc. The temperatures used in this extrusion process are shown in Table 2 below. The flowrate of the PP base layer was about 378 g/min (0.83 lb/min).

TABLE 2

Backing Layer Extruder Processing Conditions
(HPM 14.4 cm [¾ inch] Extruder)

| Region | Temp (°F.) | Temp (°C.) |
|---|---|---|
| Zone 1 | 400 | 204 |
| Zone 2 | 440 | 227 |
| Zone 3 | 470 | 243 |
| Zone 4 | 470 | 243 |
| Gate | 470 | 243 |
| Dump Valve | 470 | 243 |
| Filter | 470 | 243 |
| Melt Temp. | 470 | 243 |
| Neck Tube Temp. | 480 | 249 |
| RPM = 68 | | |

The coextruded film was allowed to fall onto a chilled chrome roll maintained at a temperature of about 16° C. (60° F.) such that the polypropylene backing layer side of the coextruded film contacted the chilled roll. The film then passed from this roll to a series of 4 pairs of heating rolls maintained at a temperature of 100° C. (212° F.) and onto a length orienting pair of rolls also maintained at 100° C. (212° F.). The last roll in this pair was run at a speed of 5 times the speed of the first roll, leading to a length orientation of the film of about 5:1. The film then passed onto to a pair of rolls also maintained at a temperature of 100° C. (212° F.).

The film then passed into a tentering oven (available from Bruckner) where the film was oriented in the transverse direction by a factor of 9:1. The temperature profile in the tenter oven is given in Table 3.

TABLE 3

Web Handling Process Conditions

Casting region:

| | |
|---|---|
| Casting roll speed: | 2.0 m/min (78.7 in/min) |
| Cast Web width: | .146 m (5.75 in) |

Length Orientation region:

| | |
|---|---|
| First roll speed: | 2.0 m/min (78.7 in/min) |
| Tenth roll speed: | 10.3 m/min (405.5 in/min) |

| Region | Temp (°F.) | Temp (°C.) |
|---|---|---|
| Zone 1 | 212 | 100 |
| Zone 2 | 212 | 100 |
| Zone 3 | 212 | 100 |
| Zone 4 | 212 | 100 |
| Zone 5 | 212 | 100 |

Machine direction stretch ratio = 5:1

TABLE 3-continued

Web Handling Process Conditions

Transverse Orientation region: (Tentering oven conditions)

| Region | Temp (°F.) | Temp (°C.) |
|---|---|---|
| Zone 1 | 327 | 164 |
| Zone 2 | 331 | 166 |
| Zone 3 | 309 | 154 |
| Zone 4 | 291 | 144 |

Transverse direction stretch ratio = 9:1

The edges of the film were then slit off and the majority of the film wound into a roll. The processing speed of the line was kept at about 10 m/min, which resulted in a final film thickness of about 30.5 µm (1.3 mils). The grafted LLDPE layer had a final thickness of about 0.66 µm (0.026 mils).

EXAMPLE 2

The fluoropolymer release material used in Example 2 was produced in the same manner as Example 1, with the exception that the NR$_f$OSEA concentration was 1.0% by weight and the initiator rate was 0.02% by weight of the total flow. The grafted LLDPE was then coextruded with polypropylene resin (#3374X), chilled, and oriented as described in Example 1.

EXAMPLE 3

The fluoropolymer release material used in Example 3 was produced in the same manner as Example 1, with the exception that the NR$_f$OSEA concentration was 2.0% by weight and the initiator rate was 0.04% by weight of the total flow. The grafted LLDPE was then coextruded with polypropylene resin (#3374X), chilled, and oriented as described in Example 1.

EXAMPLE 4

The fluoropolymer release material used in this Example was produced in a Leistritz 67 mm (2.64 in) counter-rotating twin screw extruder, L/D=35, fitted with fully intermeshing screws. The Aspun 6806 LLDPE resin was fed with an auger feeder to the hopper of a 67 mm (2.64 in) counter-rotating Leistritz twin screw extruder. The reactive NR$_f$OSEA monomer was fed into zone 3 of the extruder as a solid at a rate equivalent to 2.0% by weight of the LLDPE. The initiator blend of Example 1 was dripped into zone 3 of the extruder at a rate of 0.04% by weight of the overall materials flowrate of 908 g/min (2 lb/min); the screw rotation was 125 RPM. The nominal temperature profile of the extruder was:

| | |
|---|---|
| zone 1 | water cooled |
| zone 2 | 180° C. (356° F.) |
| zone 3 | 180° C. (356° F.) |
| zone 4 | 200° C. (392° F.) |
| zone 5 | 200° C. (392° F.) |
| zone 6 | 200° C. (392° F.) |
| zone 7 | 200° C. (392° F.) |

The grafted LLDPE was conveyed out the end of the exit port into an underwater pelletizing bath to produce generally cylindrical pellets of about 4 mm (0.16 in) in length and 2 mm (0.08 in) in diameter. The pellets produced in this process were then dried in an oven for 4 hours at 66° C. (150° F.) to remove residual moisture.

The grafted copolymer was then coextruded with polypropylene resin (#3374X), chilled and oriented in a manner similar to Example 1, with the following exceptions. The first zone of the grafted LLDPE extruder was run at 166° C. (330° F.), and the second zone was run at 188° C. (370° F.), the neck tube temperature was 200° C. (392° F.), and the screw rotation was 8 revolutions per minute. The PP backing extruder was run at 227° C. (440° F.) in the first zone, 234° C. (454° F.) in the second zone, and the screw rotation was 64 revolutions per minute. Length orientation temperatures were: zone 1°–94° C. (201° F.), zone 2°–96° C. (205° F.), zone 3°–93° C. (199° F.), zone 4°–94° C. (201° F.), and zone 5°–90° C. (194° F.). Tenter oven temperatures were: zone 1°–173° C. (343° F.), zone 2°–172° C. (342° F.), zone 3°–160° C. (320° F.), and zone 4°–147° C. (297° F.).

EXAMPLE 5

The fluoropolymer release material used in Example 5 was produced in the same manner as Example 4, with the exception that the NR$_f$OSEA concentration was 5.0% by weight of the LLDPE resin, and the initiator rate was 0.1% of the total flow. The grafted LLDPE was coextruded with polypropylene resin (#3374X), chilled, and oriented using conditions identical to Example 4.

EXAMPLE 6

The fluoropolymer release material used in this example was produced in a Leistritz 34 mm (1.34 in) co-rotating twin screw extruder, L/D=42, fitted with fully intermeshing screws. The NR$_f$OSEA was fed at 99° C. (210° F.) as a liquid into zone 5 of the 12 zone extruder by a gear pump at a rate equivalent to 7.0% by weight of the LLDPE resin. The initiator, 2,5-dimethyl-2,5-di(tbutylperoxy)hexane (Lupersol 101 from Elf Atochem North America, Inc., 2000 Market St., Philadelphia Pa. 19103), was fed into zone 1 of the extruder at 0.24% of the 127 g/min (0.28 lbs/min) overall flowrate. Maximum extruder temperatures were 182° C. (360° F.), and screw rotation was 75 RPM.

The grafted copolymer was then coextruded with polypropylene resin (#3374X), chilled and oriented as described in Example 1, although the speed of the backing layer extruder was not recorded and may not have been the same as Example 1.

EXAMPLE 7

The release material for Example 7 was produced in a Berstorff 40 mm (1.57 in) co-rotating twin screw extruder (L/D=40) fitted with fully intermeshing screws. The reactive NR$_f$OSEA monomer was fed as a solid at a rate equivalent to 1% by weight of the overall flow, and the initiator, which was the same composition as in Example 1, was fed at a rate corresponding to 0.02% of the overall flow. The base polymer was LLDPE Aspun™ 6806. All components were fed at an overall flowrate of 152 g/min (0.33 lb/min) into the feed throat of the extruder. Screw rotation was 75 RPM, and the temperature profile for each of the 160 mm zones was:

| | |
|---|---|
| zone 1 | 25° C. (77° F.) |
| zone 2 | 140° C. (284° F.) |
| zone 3 | 140° C. (284° F.) |
| zone 4 | 195° C. (383° F.) |
| zone 5 | 195° C. (383° F.) |
| zone 6 | 195° C. (383° F.) |
| zone 7 | 190° C. (374° F.) |
| zone 8 | 190° C. (374° F.) |
| zone 9 | 180° C. (356° F.) |
| zone 10 | 170° C. (338° F.) |
| end cap and melt pump | 170° C. (338° F.) |

The grafted material was extruded out of a stranding die into a water bath and then pelletized into cylindrical pellets about 4 mm (0.16 in) in length and 2 mm (0.08 in) in diameter. The pellets produced in this process were then dried in an oven for 3 hours at 66° C. (150° F.) to remove residual moisture.

Coextruded films were made with this release material with the same equipment as described in Examples 1–6. The extruder for coextrusion of the fluorochemically-grafted polymer was run under the same conditions outlined in Table 1 except that Zone 3 was 177° C. (350° F.), the Neck Tube was 200° C. (392° F.), and the screw speed was 20 RPM. The backing extruder was run under the same conditions as in Table 2 except that Zone 1 was 227° C. (440° F.), Zone 2 was 236° C. (457° F.), and the rotational speed of the screw was 60 RPM. The casting and length orientation of the film was the same as in Example 1 (see Table 3). Transverse orientation was achieved with the following temperatures at a 9:1 stretch ratio:

| | |
|---|---|
| Zone 1 | 173° C. (343° F.) |
| Zone 2 | 172° C. (342° F.) |
| Zone 3 | 162° C. (324° F.) |
| Zone 4 | 147° C. (297° F.) |

EXAMPLE 8

The release material for Example 8 was made in a manner similar to Example 7, but with the addition of 0.1% by weight each of Irganox 1010 and Irgafos 168 (available from Ciba Giegy) into zone 8 of the extruder to stabilize re-extrusion of the material. Coextruded release films were made with this release material with conditions identical to Example 7.

COMPARATIVE EXAMPLE 1

Aspun™ 6806 LLDPE was extruded through the 40 mm (1.6 in) twin screw extruder under conditions identical to Example 7 except that there was no peroxide initiator nor any reactive NR$_f$OSEA monomer. This LLDPE was then coextruded with the polypropylene backing layer under conditions identical to example 7 to produce a control sample of oriented film.

COMPARATIVE EXAMPLE 2

A coextruded release coating film was produced in the same manner as Example 4, except that the reactive NR$_f$O-SEA monomer was added at a rate of 1% of the overall flow and no initiator was added. The resultant extrudate was thus a physical blend of LLDPE and NR$_f$OSEA monomer. The blended release material was then coextruded with the polypropylene backing layer under conditions identical to Example 4 to produce a comparative sample of oriented film wherein the moiety comprising a fluoroaliphatic group is not grafted to the base polymer in the release material.

EXTRUSION COATED RELEASE COATED FILM WITH SUBSEQUENT ORIENTATION

EXAMPLE 9

The fluoropolymer release material was produced on the extruder described in Example 2. The NR$_f$OSEA was dissolved in tetrahydrofuran (THF) at 1 part NR$_f$OSEA to 2 parts THF and injected into zone 3 of the extruder at a rate equivalent to 6.9% by weight monomer in the final composition. The initiator was the same as described in Example 1 and was added into the feed of the extruder at a rate equivalent of 0.25% by weight. Virtually all of the THF was vented out of a port fitted to a vacuum pump in zone 8 of the extruder. The screw speed of the extruder was 105 RPM, and the temperature profile of each of the 120 mm (4.72 in) zones was:

| | |
|---|---|
| zone 1 | water cooled |
| zone 2 | 145° C. (284° F.) |
| zone 3 | 145° C. (284° F.) |
| zone 4 | 145° C. (383° F.) |
| zone 5 | 180° C. (356° F.) |
| zone 6 | 180° C. (356° F.) |
| zone 7 | 180° C. (356° F.) |
| zone 8 | 180° C. (356° F.) |
| zone 9 | 180° C. (356° F.) |
| zone 10 | 180° C. (356° F.) |
| endcap | 180° C. (356° F.) |

For the release film, a single manifold die was used to extrude only the polypropylene backing layer. The backing layer was length oriented as described in Example 1. The grafted LLDPE resin was then extrusion coated at approximately 10 cm (4 in) wide in the center of the length oriented polypropylene backing layer prior to entering the tenter oven. The extrusion conditions for running the 3.2 cm (1¼ in) diameter, 16:1 length-to-diameter ratio single screw extruder were the same as those described in Example 1, however a single manifold extrusion die was used to extrusion coat the grafted LLDPE resin onto the polypropylene backing layer. The die used was a 10.2 cm (4 in) wide die similar to those available from Extrusion Dies, Inc. (Chippewa Falls, Wis.). In this operation, the base polypropylene backing layer was passed between a chilled silicone rubber-coated roll and a non-heated chrome coated roll. The grafted LLDPE resin molten film then flowed out of the die and onto the 15.24 cm (6 in) wide backing layer, passing between the rubber coated roll and the backing layer, to give a release film about 25.4 μm (1 mil) thick. The die through which the grafted LLDPE resin passed was kept at a temperature of 193° C. (380° F.). The coated backing layer subsequently passed into the tenter oven. By this extrusion process, the grafted polymer layer in the two-layer film was approximately 2–2.5 μm (0.08–0.1 mils) thick.

EXAMPLE 10

The fluoropolymer release material used in Example 10 was produced as described in Example 2 except that after grafting, the grafted LLDPE was blended with ungrafted LLDPE in a weight ratio of 1:3. The extrusion coated film was then made in a manner identical to Example 9 with the blend of grafted LLDPE and virgin LLDPE resin as the release layer.

Release Property Testing of Examples 1–10 and Comparative Examples 1–2

Each of the films of Examples 1–10 and Comparative Examples 1–2 was tested for its release properties. A 2.5 cm (1 in) wide, 20 cm (7.9 in) long strip of a commercially available block copolymer adhesive based pressure sensitive adhesive tape (3M Box Sealing Tape #371, 3M Company) was adhered to the release coated surface of each of the films. The film samples for each test were approximately 10 cm (3.9 in) wide and 15 cm (5.9 in) long. The free end of the #371 tape extended beyond the end of the test substrate. The tape/substrate was rolled twice with a 2 kg (4.5 pound) hard rubber roller to ensure contact between the adhesive and the test substrate. The sample was then conditioned in a constant temperature and humidity room for one hour at 21° C. (70° F.) and 50% RH. The free end of the tape was removed from the test substrate by pulling it at 180 degrees at a rate of 30.5 cm/minute (12 inches/minute) using a Slip/Peel Tester, (available from Instrumentors, Inc. Strongsville, Ohio). The results are reported in Table 4. The reported results represent the average of three to five independent measurements.

After the #371 test tape was removed from the release coated surface of the films, the amount of transfer of the release coating to the adhesive of the #371 tape was determined by measuring the readhesion of the #371 tape to glass. The #371 tape was applied to the surface of a heptane washed float glass plate and rolled down with a single pass of a 2.0 kg (4.5 lb) rubber roller. Test conditions were at 21° C. (70° F.) and 50% RH. The #371 tape was removed from the glass plate by pulling at 180 degrees at a rate of 229 cm/min (90 inches/min) using Slip/Peel Tester (available from Instrumentors, Inc., Strongsville, Ohio). The measured values are listed in Table 4. The listed values represent the average of three to five independent measurements.

TABLE 4

Peel Test Results

| | Peel Force | | Readhesion | | Weight % | Target Release Layer Thickness | |
|---|---|---|---|---|---|---|---|
| | | N/100 | | N/100 | | | |
| Sample | oz/in | mm | oz/in | mm | NR$_f$OSEA | μm | mils |
| Example 1 | 14 | 15 | 61 | 67 | .5 | 0.66 | 0.03 |
| Example 2 | 8 | 9 | 63 | 69 | 1 | 0.51 | 0.02 |
| Example 3 | 5 | 5.5 | 60 | 66 | 2 | 0.51 | 0.02 |
| Example 4 | 4 | 4.4 | 51 | 56 | 2 | 0.51 | 0.02 |
| Example 5 | 2 | 2.2 | 57 | 62 | 5 | 0.51 | 0.02 |
| Example 6 | 5 | 5.5 | 54 | 59 | 7 | 0.51 | 0.02 |
| Example 7 | 2 | 2.2 | 52 | 57 | 1 | 2.5 | 0.1 |
| Example 8 | 2 | 2.2 | 53 | 58 | 1 | 2.5 | 0.1 |
| Comp Example 1 | 28 | 31 | 49 | 54 | 0 | 2.5 | 0.1 |
| Comp Example 2 | 28 | 31 | 47 | 51 | 1 | 0.51 | 0.02 |
| Example 9 | 3 | 3.3 | 52 | 57 | 6.9 | 2.5 | 0.1 |
| Example 10 | 12 | 13 | 57 | 62 | 1.7 | 2.5 | 0.1 |

The examples of the invention all show lower peel force values than Comparative Example 1, a sample that was coextruded without fluorochemical in the release layer. The data shows a decrease in peel values going from 0.5% to 7% monomer, and a decrease in peel values with thicker release layers. The peel force of 31N/100 mm (28 oz/in) indicated for Comparative Example 2, the sample comprising an ungrafted fluorochemical release layer, is higher than expected but is likely due to a longer aging time between extrusion and testing of the release coated film. Testing on the other samples occurred within one month of extrusion, whereas the peel values for Comparative Example 2 were obtained after seven months aging at room temperature. Diffusion and/or transfer of the NR$_f$OSEA may have occurred during that time. For comparison, after the same seven months aging time, Example 5 was retested at 6.6N/ 100 mm (6 oz/in) peel and 62N/100 mm (57 oz/inch) readhesion (compared to 2.2N/100 mm (2 oz/inch) and 62N/100 mm (57 oz/inch) within a month of extrusion).

The readhesion values observed for all examples are not significantly different within expected experimental error. The minimal acceptable readhesion value varies with specific applications. For packaging tape, an initial readhesion value above about 36 oz/in (40N/100 mm) is acceptable. Comparative Example 2, which contained the ungrafted fluorochemical monomer, also showed acceptable initial readhesion, although the readhesion value often drops with aging due to migration of the fluorochemical into the adhesive.

The difference in release levels as indicated by the peel force values between the coextruded (Examples 1–8) and extrusion coated (Examples 9 and 10), materials having similar levels of release agent, may be attributed to the difference in orientation experienced by the release surface. Between the two extrusion coated films (Examples 9 and 10) Example 10 has a higher peel force value than Example 9. This is due largely to the blending of the Example 10 release material with 1 part to 3 parts ungrafted LLDPE to produce an overall concentration of about 1.7% fluorochemical in the extruded release layer as compared to a 6.9% fluorochemical in the release layer of Example 10.

In all the films of the present invention (Examples 1–8, 9 and 10), the release layer was intimately bonded to the backing material such that the release layer could not easily be separated physically from the backing material.

TAPES MADE FROM COEXTRUDED RELEASE COATED FILM

EXAMPLES 11 AND 12

Pressure sensitive adhesive tape Examples 11 and 12 were made from the coextruded release coated film samples described in Examples 7 and 8, respectively. A 35.6 cm (14 inch) wide roll of each of the extrusion coated films on a 15.2 cm (6 inch) paper core was slit into two 15.2 cm by 9140 cm (6 inch by 3600 inches) film rolls and wound onto a 7.62 cm (3 inch) paper core. The resulting film rolls were then corona treated on the polypropylene side only (the side to which the adhesive is be applied) to a target surface tension of about 38–42 dynes/cm$^2$. The level of treatment is adjusted by a combination of power setting, frequency, and line speed. Tape samples were then prepared by hot melt coating a block copolymer rubber resin adhesive onto the corona treated surface of the films. The adhesive comprised 100 parts by weight Kraton™ 1107 styrene-isoprene-styrene (SIS) rubber (available from Shell Chemical Company, Houston, Tex.); 100 parts by weight ESCOREZ™ 1310LC tackifier resin (available from Exxon Chemical Company, Houston, Tex.) per 100 parts rubber; 1.5 parts by weight Irganox™ 1076 antioxidant (obtained from Ceiba-Geigy Corporation, Ardsley, N.Y.) per 100 parts rubber; and 1.5 parts by weight rubber Cyanox™ LTDP antioxidant (available form American Cyanamide Corporation, Bound Brook, N.J.) per 100 parts rubber. The adhesive was coated at about 17.7 grams per sq. meter (4.2 grains/24 sq. in). The width of the coating was approximately 11.4–12.7 cm (4.5–5.0 in). Two tape rolls having dimensions 5.1 cm×9140 cm (2 in by 3600 in) were slit from this roll for tape performance testing.

Release Property Testing of Examples 11–12

2.54 cm (1 in) strips of the tape were hand slit from each of the 5.08 cm (2 in) wide tape rolls and tested for their release properties. The unwind force values were determined according to a variation of ASTM D 3811. The tape samples were aged in a constant temperature and humidity room for 24 hours at 21° C. (70° F.) and 50% relative humidity. Three laps of tape were removed from a free turning roll, and the roll of tape was centered on the spindle of an unwind apparatus designed to replace the lower jaw on an Instron Tester (available from Instron Corporation). The free end of the tape was folded over to form a tab, and the tab was clamped in the upper jaw of the Instron Tester. Approximately 15.2 cm (6 in) of tape was unwound at a rate of 30.5 cm/min (12 in/min), and the average peel value was recorded. The results are reported in Table 5 and represent the average of three to five independent measurements.

After the tape was unwound, the amount of transfer of the release coating was determined by measuring the adhesion of the test tape to steel. A test surface of bright annealed 304 stainless steel measuring 5.08 cm (2 in) by 12.7 cm (5 in) by 0.16 cm (¹⁄₁₆ in) was prepared by washing once with diacetone alcohol and three times with normal heptane. A strip of test tape measuring about 2.54 cm (1 in) by 37.9 cm (11 in) was applied to the surface of the steel panel with about 15.2 cm (6 in) extending beyond the panel. The tape was rolled down with a single pass of a 2.0 kg (4.5 lb) rubber roller at a rate of about 30.5 cm/min (12 in/min). Test conditions were at 21° C. (70° F.) and 50% relative humidity. The free end of the tape was doubled back and approximately 2.54 cm (1 in) was peeled from the panel. The free end of the tape was then folded over to form a tab. The end of the panel from which the tape was removed was clamped into the lower jaw of an Instron Tester (available from Instron Corporation), and the tab of the test tape was clamped in the upper jaw of the Instron Tester. The test tape was then removed from the steel panel by pulling at 180 degrees at a crosshead speed of 30.5 cm/min (12 in/min) and the results were recorded. The measured values are listed in Table 5 and represent the average of three to five independent measurements.

TABLE 5

| | Roll Unwind and Adhesion Test Results | | | |
|---|---|---|---|---|
| | Unwind Force | | Adhesion | |
| Sample | oz/in | N/100 mm | oz/in | N/100 mm |
| Example 11 | 9 | 9.9 | 50 | 54.7 |
| Example 12 | 7 | 7.7 | 50 | 54.7 |

The tapes of Examples 11 and 12 were aged at 49° C. (120° F.) for 11 days and tested for their release properties as described above. Example 11 showed an aged unwind peel force of 12N/100 mm (11 oz/in) and an aged adhesion to steel value of 46N/100 mm (43 oz/in), compared to the initial values of 9.9N/100 mm (9 oz/in) and 55N/100 mm (50 oz/in) shown above. Example 12 showed an aged unwind peel force of 9.9N/100 mm (9 oz/in) and an aged adhesion to steel value of 46N/100 mm (42 oz/in), compared to initial values of 7.7N/100 mm (7 oz/in) and 55N/100 mm (50 oz/in), respectively. Thus, upon aging, the unwind peel force slightly increased while the adhesion to steel decreased. The aged adhesion values are, however, well above a minimum preferable value of 40N/100 mm (36 oz/in), indicating that the release coating is stable with time and does not tend to separate from the backing and transfer or migrate into the adhesive with aging.

BLOWN COEXTRUDED RELEASE COATED FILM

Examples of blown coextruded release coated film were produced by extruding the multilayer release coated film out of a circular die in which positive air pressure is maintained on the inner side of the extruded tube. The film undergoes stretching in the extrusion direction by a take-away system and in the cross direction by the positive pressure on the inside surface of the film. The extruded film forms a "frost line" at the point where the polymer cools below its melting point, and beyond this point, very little additional stretching occurs. The blown release coated film was extruded vertically upwards, and at a point past the frost line, the circular film was passed between two nip rollers to flatten it for collection. The nip aids in maintaining the positive pressure on the inside of the tube. The blown release coated film may be oriented.

COMPARATIVE EXAMPLE 3

This comparative example was coextruded with a two layer, 5.1 cm (2 in) diameter blown film extrusion die with a die orifice of 0.76 mm (30 mils). The base layer was the outer layer of the film and was fed with a 3.8 cm (1.5 in) 24:1 length-to-diameter ratio Flowmaster single screw extruder running at 27 revolutions per minute. The release layer manifold was fed with a 1.9 cm (¾ in) 24:1 L/D Killion single screw extruder running at 10 revolutions per minute. Both layers were fed with Eastman™ Plastics Tenite™ polyethylene 1550P having a melt flow index of 3.5 (available from Eastman Chemical Company, Kingsport Tenn.). The height of the tube above the die was 1.45 m (57 inches), the take-away speed was 4.6 m/min (15 ft/min), and the layflat width of the tube was 27.2 cm (10.7 inches). The extrusion conditions for the two extruders are shown in Table 6. The die temperature was 204° C. (400° F.).

TABLE 6

Extruder Conditions for Blown Film Coextrusion

| Region | 1.9 cm (.75 in) Extruder | | 3.8 cm (1.5 in) Extruder | |
| --- | --- | --- | --- | --- |
| | Temp (°F.) | Temp (°C.) | Temp (°F.) | Temp (°C.) |
| Zone 1 | 350 | 177 | 266 | 130 |
| Zone 2 | 375 | 191 | 365 | 185 |
| Zone 3 | 400 | 204 | 392 | 200 |
| Head section | 400 | 204 | 428 | 220 |
| Neck tube | 400 | 204 | 400 | 204 |
| Extruder RPMs | 10 | | 27 | |

The inside of the blown film was post-embossed for use as a diaper backsheet. The blown film was slit and fed into a nip with a steel engraved roll and an approximately 90 durometer rubber roll. The temperature of the rolls was 74° C. (175° F.); the line speed was 3 m/min (10 ft/min); and the nip pressure was 2190N/100 mm (125 pounds per lineal inch). The pattern was an 33 lines/cm (85 lines/in) post pattern with a post area of approximately 3% and the depth of penetration into the film was approximately 15 micrometers. The film was air cooled immediately after embossing at the nip. The material was tested for adhesion and readhesion as described below.

EXAMPLE 13

The release material for Example 13 was produced in a Berstorff 40 mm co-rotating twin screw extruder (L/D=40) fitted with fully intermeshing screws. The monomer n-methyl perfluorooctanesulfonamido ethyl acrylate was fed as a solid at a rate equivalent to 1% by weight of the overall flow, and the initiator, which was the same composition as Example 1, was fed at a rate corresponding to 0.02% of the overall flow. The base polymer was Exxon Escorene polypropylene 1024, having a melt flow index of 12 (available from Exxon Chemical Americas, a division of Exxon Chemical Company, Houston, Tex.). All components were fed at an overall flowrate of 13.6 kg/h (30 lbs/hr) into the feed throat of the extruder. Screw rotation was 75 RPM, and the temperature profile for each of the 160 mm zones was:

| | |
| --- | --- |
| zone 1 | 20° C. |
| zone 2 | 180° C. |
| zone 3 | 180° C. |
| zone 4 | 190° C. |
| zone 5 | 190° C. |
| zone 6 | 190° C. |
| zone 7 | 195° C. |
| zone 8 | 195° C. |
| zone 9 | 195° C. |
| zone 10 | 195° C. |
| end cap and melt pump | 190° C. |

The grafted material was extruded out of a stranding die into a water bath and then pelletized into cylindrical pellets about 4 mm in length and 2 mm in diameter. The pellets produced in this process were then dried in an oven for 3 hours at 66° C. (150° F.) to remove residual moisture. This fluorochemically-grafted polypropylene was then dry-blended at 50 percent by weight with Eastman™ Plastics Tenite™ polyethylene 1550P, having a melt flow index of 3.5 (available from Eastman Chemical Company, Kingsport Tenn.). The blown release coated film of Example 13 was produced in a manner similar to Comparative Example 3 except that the fluorochemically-grafted polypropylene/polyethylene blend was extruded though the 1.9 cm (0.75 inch) Killion extruder; the extrusion conditions are shown in Table 7, and the die temperature was 420° F. (216° C.). The release side (inside of extruded tube) of the coextruded blown film was post-embossed using the method described in Comparative Example 3. Adhesion and readhesion values for this film were measured as described below. Overall film thickness and release layer thickness, as determined from freeze-fractured samples under Scanning Electron Microscopy, are displayed in Table 9.

TABLE 7

Extruder Conditions for Blown Film Coextrusion

| Region | 1.9 cm (0.75 in) Extruder | | 3.8 cm (1.5 in) Extruder | |
| --- | --- | --- | --- | --- |
| | Temp (°F.) | Temp (°C.) | Temp (°F.) | Temp (°C.) |
| Zone 1 | 350 | 177 | 266 | 130 |
| Zone 2 | 400 | 204 | 365 | 185 |
| Zone 3 | 420 | 216 | 392 | 200 |
| Head section | 400 | 216 | 428 | 220 |
| Neck tube | 420 | 216 | 400 | 204 |
| Extruder RPMs | 60 | | 20 | |

EXAMPLE 14

Example 14 was made in a manner similar to Example 13 except that during the grafting operation, the overall flowrate of the monomer n-methyl perfluorooctanesulfonamido ethyl acrylate was 2% and the flowrate of the initiator was 0.04% of the overall flowrate. Adhesion and readhesion values for this coextruded blown film were determined as described below. Overall film thickness and release layer thickness, as determined from freeze-fractured samples under Scanning Electron Microscopy, are displayed in Table 9 below.

EXAMPLE 15

Example 15 was made in a manner similar to Example 13 except that during the grafting operation, the overall flowrate of the monomer n-methyl perfluorooctanesulfonamido ethyl acrylate was 3% and the flowrate of the initiator was 0.06% of the overall flowrate. Adhesion and readhesion values for this coextruded blown film were determined as described below. Overall film thickness and release layer thickness, as determined from freeze-fractured samples under Scanning Electron Microscopy, are displayed in Table 9 below.

Release Property Testing of Examples 13–15 and Comparative Example 3

Each of the blown release coated films of Examples 13–15 and Comparative Example 3 was tested for its release properties. In a variation of PSTC-5, each of the films was conditioned in a constant temperature and humidity room for 24 hours at 21° C. (70° F.) and 50% relative humidity. At these same temperature and humidity conditions, a 7.62 cm by 2.5 cm (3 inch by 1 inch) cm strip of a standard diaper fastening tape having a polypropylene backing and a block copolymer adhesive (available from 3M Company as KR-0263) was extended to a length of 30.5 cm (12 inches) with a piece of paper of equal width and adhered to the release coated surface of the film. The release coated film which was approximately 10 cm (3.93 in) wide and 15 cm (5.90 in) long. The paper end of the KR-0263 tape extended beyond the end of the test substrate. The tape/substrate was rolled twice with a 2.0 kg (4.5 lb) hard rubber roller to ensure contact between the adhesive and the test substrate. The free end of the tape was removed from the test substrate by pulling at 135 degrees at a rate of 30.5 cm/min (12 in/min) using an Instron Tester, (available from Instron Corporation). The results are reported in Table 8. The reported results represent the average of two independent measurements.

After the test tape was removed from the release coated substrate, the amount of release coating transferred to the adhesive of the KR-0263 tape was assessed by measuring the readhesion of the KR-0263 tape to polyethylene. The KR-0263 tape was applied to one surface of a 330 μm (13 mil) smooth polyethylene sheet and rolled down with two passes of a 100 gram hard rubber roller. The test conditions were again at 21° C. (70° F.) and 50% relative humidity. The KR-0263 tape was then peeled from the polyethylene sheet at an angle of 90 degrees at a speed of 30.5 cm/min (12 in/min). The results are reported in Table 8. The reported results represent the average of two independent measurements.

TABLE 8

Blown Film Peel and Readhesion Test Results

| Sample | Peel Force | | Readhesion | |
|---|---|---|---|---|
| | g/in | N/100 mm | g/in | N/100 mm |
| Example 13 | 1068 | 1170 | 706 | 773 |
| Example 14 | 482 | 528 | 594 | 650 |
| Example 15 | 263 | 288 | 546 | 598 |
| Comparative Example 3 | 1117 | 1230 | 715 | 783 |

Comparative Example 3 (which contained no release material) showed a higher peel force value than Examples 13, 14 and 15 which comprised a release layer having 0.5% by weight, 1% by weight and 1.5% by weight, fluorochemical, respectively. The readhesion value of Comparative Example 3 was also higher than those of Examples 13, 14 and 15 as expected, as Comparative Example 3 comprised no release material. The peel force values decrease with increasing fluorochemical concentration. For diaper applications, the readhesion values of Examples 13, 14 and 15 are acceptable.

TABLE 9

Layer thickness of coextruded blown films as measured by SEM.

| Sample | Total film thickness μm (mils) | Release layer thickness μm (mils) |
|---|---|---|
| Example 13 | 32 (1.3) | 7 (.28) |
| Example 14 | 36 (1.4) | 10 (.39) |
| Example 15 | 35 (1.4) | 10 (.39) |

CAST, UNORIENTED RELEASE COATED FILM

EXAMPLE 16

The release material for this Example was produced in a Berstorff 40 mm co-rotating twin screw extruder (L/D=40) fitted with fully intermeshing screws. The NR$_f$OSEA was fed as a solid at a rate equivalent to 2% by weight of the overall flow, and the initiator, which was the same composition as Example 1, was fed at a rate corresponding to 0.04% of the overall flow. The base polymer was Exxon Polypropylene 3445 resin with a melt flow index of 35. All components were fed at an overall flowrate of 20 lbs/hr (9.1 kg/hr) into the feed throat of the extruder. Screw rotation was 100 RPM, and the temperature profile for each of the 160 mm zones was:

| | |
|---|---|
| zone 1 | water cooled |
| zone 2 | 170° C. |
| zone 3 | 180° C. |
| zone 4 | 190° C. |
| zone 5 | 190° C. |
| zone 6 | 190° C. |
| zone 7 | 190° C. |
| zone 8 | 200° C. |
| zone 9 | 200° C. |
| zone 10 | 200° C. |
| end cap and melt pump | 190° C. |

The grafted material was extruded out of a stranding die into a water bath and then pelletized into cylindrical pellets of about 4 mm in length and 2 mm in diameter. The pellets produced in this process were then dried in an oven for 4 hours at 66° C. (150° F.) to remove residual moisture. A film of the invention was prepared from the pelletized grafted release material. The grafted release material was coextruded with an impact polypropylene polyethylene copolymer resin, 7C05N available from Shell Chemical Company. The resin was extruded through both a 90 mm (3.5 inch) Davis Standard extruder at a rate of 136 kg/h (300 lb/hr) and a 60 mm twin screw Berstorff extruder at a rate of 91 kg/h (200 lb/hr). A Normag Inc. gear pump was located at the end of the twin screw extruder. The release material was extruded though a 38 mm (1.5 in) Killion extruder running at 30 rpm. All three extruders were connected to a three-layer feedblock, available from Cloeren Company. The feedblock was attached to a 157.2 cm (61.9 in) extrusion die, available from EDI Inc. Both the feedblock and die were set to 218° C. (425° F.). The extrudate was cooled in a nip comprising a mirror finish chrome roll at 60° C. (140° F.) and a teflon nip roll cooled to 10° C. (50° F.). The of the film was 0.0038 cm (1.5 mil). The temperature profiles are in Table 10.

TABLE 10

Cast film extruder conditions

| Zone | Extruder | | |
|---|---|---|---|
| | Davis Std. | Berstorff | Killion |
| 1 | 182° C. | 177° C. | 149° C. |
| 2 | 204° C. | 193° C. | 182° C. |
| 3 | 215° C. | 204° C. | 198° C. |
| 4 | 215° C. | 215° C. | 198° C. |
| 5 | 215° C. | 215° C. | — |
| 6 | 215° C. | — | — |
| Adapters | 215° C. | 215° C. | 198° C. |

EXAMPLE 17

Example 16 was repeated except that the extruder used to coextrude the grafted polypropylene was run at 15 RPM to give an approximate release layer thickness of 0.27 μm.

EXAMPLE 18

Example 16 was repeated except that the NR$_f$OSEA was fed at a rate of 3% by weight and the initiator was fed at a rate of 0.06% of the overall flowrate extruder used to coextrude the release material was run at 30 RPM, giving an approximate release layer thickness of about 0.27 μm.

EXAMPLE 19

Example 16 was repeated except that the NR$_f$OSEA was fed at a rate of 5% by weight and the initiator was fed at a rate of 0.06% of the overall flowrate. The extruder used to coextrude the release material was run at 30 RPM, giving an approximate release layer thickness of about 0.54 μm.

EXAMPLE 20

Example 19 was repeated except that extruder used to coextrude the grafted polypropylene was run at 15 RPM to give an approximate release layer thickness of about 0.27 μm.

Release Property Testing of Examples 16–20

Each of the cast release coated films of Examples 16–20 was tested for its release properties in the same manner as described for Examples 13–15 and Comparative Example 3.

TABLE 11

Cast Film Peel and Readhesion Test Results

| | Weight % | Peel Force | | Readhesion | | |
|---|---|---|---|---|---|---|
| Example | NR$_f$OSEA | g/in | N/100 mm | g/in | N/100 mm | RPM |
| 16 | 2% | 1000 | 1010 | 749 | 820 | 30 |
| 17 | 2% | 1110 | 1220 | 723 | 792 | 15 |
| 18 | 3% | 575 | 630 | 713 | 781 | 30 |
| 19 | 5% | 188 | 206 | 771 | 844 | 30 |
| 20 | 5% | 400 | 438 | 719 | 787 | 15 |

This data shows that the peel force values decrease with increasing levels of fluorochemical, as expected, and that the peel force also decreases with the caliper of the release layer as determined by the extruder speed. The readhesion values were all acceptable for diaper applications.

ADHESIVE TAPE COMPRISING CAST FILM

EXAMPLE 21

The release material for this example was produced as described in Example 2, and a coextruded construction was produced as a cast film and not oriented. The grafted linear low density polyethylene (LLDPE) produced in Example 2 was coextruded with a polypropylene resin #3014 obtained from Exxon Chemical Company, using a multi-manifold die available from Cloeren Extrusion Die Company, to produce a two-layer film. In this specific die, each polymer layer passed though a separate manifold which was of equivalent width for each layer. The molten polymer streams flowed across a moveable vane and flowed together as they left the tip of the vane. The streams then flowed together though a thin channel and subsequently flowed out of the die. The grafted LLDPE was extruded with a 3.2 cm (1¼ in) extruder available from Killion Extruders Inc. The temperature profile for this extruder is shown in Table 12. The flowrate of the grafted LLDPE layer was about 2.3 kg/h (5 lb/h). The polypropylene backing layer was extruded with a 5.08 cm (2 in) extruder available from Berlyn Extruders Inc. The temperatures of this extrusion process are listed in Table 13. The flowrate of the polypropylene backing layer was about 9.1 kg/hr (20 lbs/hr). The multi-manifold die was maintained at 232° C. (450° F.).

TABLE 12

Graft Polymer 1¼" Extruder Processing Conditions
(Killion 1¼" (3.2 cm) Extruder

| Region | Temp (°F.) | Temp (°C.) |
|---|---|---|
| Zone 1 | 250° F. | 121° C. |
| Zone 2 | 330° F. | 166° C. |
| Zone 3 | 370° F. | 188° C. |
| Endcap | 370° F. | 188° C. |
| Neck Tube Temp. | 370° F. | 188° C. |
| RPM = 20 | | |

TABLE 13

Backing Layer Extruder Processing Conditions
(Berlyn 2" [5.08 cm] Extruder)

| Region | Temp (°F.) | Temp (°C.) |
|---|---|---|
| Zone 1 | 300° F. | 149° C. |
| Zone 2 | 350° F. | 177° C. |
| Zone 3 | 400° F. | 204° C. |
| Zone 4 | 450° F. | 232° C. |
| Zone 5 | 450° F. | 232° C. |
| Zone 6 | 450° F. | 232° C. |
| Zone 7 | 450° F. | 232° C. |
| Neck Tube Temp. | 450° F. | 232° C. |
| RPM = 20 | | |

The coextruded film was allowed to fall onto a chilled chrome roll maintained at a nominal temperature of 16° C. (60° F.). The film passed from this roll to a wind-up unit, which slit off the edges of the film and wound the majority of the film into a roll.

It was noticed that with this cast coextrusion process the layer of grafted polyethylene could be removed from the polypropylene backing layer by slitting the edge of the film and subsequently tearing the film for a small length. In the tear region, the film delaminated enough to allow one to grab each individual layer. The individual layers were stripped apart and their thickness measured with a standard industrial contact thickness gauge. A force of about 6.7N/100 mm (173 g/in) was needed to separate the layers. The backing layer was found to be approximately 508 μm (2 mils) thick, and the grafted polyethylene layer was found to be approximately 12.7 μm (0.5 mils) thick.

Adhesive tapes samples were made from the coextruded cast film composition described. Tape samples were prepared by coating a block copolymer rubber resin adhesive similar to that described in Examples 17–18 of U.S. Pat. No. 5,019,071 (Bany) except that Shellflex™ 371 was employed. Shellflex™ 371 is also described in said patent. The adhesive was applied to the surface of the backing layer opposite the release coating at a nominal 21 grams/m² (5 grains/24 sq. in) using a hot melt coater. Unwind force values for the tape were determined using the same method described above for testing the tapes of Examples 11 and 12, except that the crosshead speed was 50.8 cm/min (20 in/min). The results are reported in Table 14. The results represent the average of two independent measurements. The amount of release material transferred to the adhesive of the tape was determined by measuring the adhesion to a sheet of 330 μm (13 mils) smooth polyethylene using the same method described for testing Examples 11 and 12. The results are reported in Table 14 and represent the average of two independent measurements.

EXAMPLE 22

This release film of this Example was prepared as described in Example 21 except that the polyethylene resin #6806 used in the grafting process was replaced by a polypropylene resin #3085, melt flow index of 35, obtained from Exxon Chemical Corp. Again, adhesive tape samples were made from the coextruded cast film by hot melt coating a block copolymer rubber resin adhesive such as described in Example 21 onto the coextruded release coated film after the cast film was wound into a roll. Unwind force and adhesion values were determined as in Example 22 and are reported in Table 14.

TABLE 14

Unwind and Readhesion Test Results

| Sample | Unwind Force | | Adhesion | |
|---|---|---|---|---|
| | g/in | N/100 mm | g/in | N/100 mm |
| Example 21 | 880 | 34.0 | 808 | 31.2 |
| Example 22 | 520 | 20.0 | 840 | 32.4 |

Although the present invention has been described with respect to specific embodiments, the invention is not intended to be limited to those embodiments. Rather, the invention is defined by the claims and equivalents thereof.

What is claimed is:

1. A release coated film, comprising:
   (a) at least one polymeric backing layer having first and second major surfaces; and
   (b) an extruded fluoropolymer release layer on at least a portion of at least one major surface of said backing layer,
   wherein said fluoropolymer release layer comprises a graft copolymer of (i) a base polymer containing polymerized units derived from monomers having terminal olefinic double bonds and (ii) a moiety comprising a fluoroaliphatic group, wherein said backing layer and said fluoropolymer release layer are intimately bonded, and further wherein the release coated film is oriented in at least one direction.

2. The release coated film of claim 1 wherein said backing layer and said fluoropolymer release layer are coextruded.

3. The release coated film of claim 1 wherein said fluropolymer release layer is extruded onto said backing layer.

4. A release coated film according to claim 1, wherein said fluoropolymer release layer and said backing layer are blown.

5. A release coated film according to claim 1, wherein said film has a total film thickness of about 10 μm to 150 μm.

6. A release coated film according to claim 1, wherein said film has a thickness of 25 μm to 50 μm.

7. A release coated film according to claim 1, wherein said base polymer used to prepare said graft copolymer is selected from the group consisting of polypropylene, polyethylene and mixtures and copolymers thereof.

8. A release coated film according to claim 1, wherein said backing is a thermoplastic polymer.

9. A release coated film according to claims 1, wherein said moiety is derived from monomers having the formula:

wherein:

R$_f$ is a fluoroaliphatic group comprising a fully fluorinated terminal group containing at least seven fluorine atoms, a is an integer from 1 to about 10;

b is an integer from 1 to about 2;

Q is an (a+b)-valent linking group that does not substantially interfere with free radical polymerization; and R is hydrogen or lower alkyl.

10. A release coated film according to claim 1, wherein said moiety is derived from a fluorochemical olefin selected from the group consisting of $C_8F_{17}SO_2N(C_4H_9)CH_2CH_2OC(O)CH=CH_2$, $C_8F_{17}SO_2N(C_2H_5)CH_2CH_2OC(O)CH=CH_2$, $C_8F_{17}SO_2N(CH_3)CH_2CH_2OC(O)CH=CH_2$, $C_8F_{17}SO_2N(C_2H_5)CH_2CH=CH_2$, and
$C_8F_{17}SO_2N(C_2H_5)CH_2CH_2OC(O)C(CH_3)=CH_2$.

11. A release coated film according to claims 1, wherein said moiety has the formula wherein R is hydrogen or lower alkyl, Q is a divalent organic linking group that does not interfere with free-radical polymerization, $R_f$ is a fluoroaliphatic group comprising a fully fluorinated terminal group containing at least seven fluorine atoms, and x is an integer from 1 to about 10.

12. A release coated film according to claims 1, wherein said fluoropolymer release layer is present on both major surfaces of said backing layer.

13. A release coated film according to claims 1, wherein said fluoropolymer release layer comprises a blend of said graft copolymer and a thermoplastic polymer.

14. A release coated film according to claim 13, wherein said thermoplastic polymer is selected from the group consisting of polyamide, polypropylene, polyethylene, polybutylene, poly-4-methylpentene, polystyrene, polyvinyl chloride, polyvinyl acetate, ethylene/propylene copolymer, propylene/butylene copolymer, ethylene/propylene/butylene terpolymer, ethylene/vinyl acetate copolymer, ethylene/butyl acrylate copolymer, and mixtures thereof.

15. The released coated film of claim 1 wherein the polymer of the backing layer is different from the base polyer of the release layer.

16. The release coated film of claim 1, wherein the release layer is about 0.25 μm to about 6.4 μm in thickness.

* * * * *